US011503693B2

(12) United States Patent
Hao et al.

(10) Patent No.: US 11,503,693 B2
(45) Date of Patent: Nov. 15, 2022

(54) DRIVER UNIT, DRIVER AND LED LIGHT SOURCE WITH A DRIVER

(71) Applicant: LEDVANCE GmbH, Garching bei Munchen (DE)

(72) Inventors: Xiangyin Hao, Shenzhen (CN); Daogang Wei, Shenzhen (CN); Xiao Ruan, Shenzhen (CN); Dayi Zhong, Shenzhen (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 17/313,468

(22) Filed: May 6, 2021

(65) Prior Publication Data

US 2021/0352794 A1 Nov. 11, 2021

(30) Foreign Application Priority Data

May 6, 2020 (CN) .......................... 202010373974.X

(51) Int. Cl.
*H05B 47/165* (2020.01)
*H05B 45/30* (2020.01)

(52) U.S. Cl.
CPC ........... *H05B 47/165* (2020.01); *H05B 45/30* (2020.01)

(58) Field of Classification Search
CPC .... H05B 47/165; H05B 45/30; H05B 45/345; H05B 45/382; H02M 3/33515; H02M 1/0025; H02M 3/33523
See application file for complete search history.

(56) References Cited

U.S. PATENT DOCUMENTS

| 10,948,144 B1* | 3/2021 | Slowik ...................... F21S 9/02 |
| 2005/0276053 A1* | 12/2005 | Nortrup ................... F21V 29/67 |
| | | 362/234 |
| 2016/0330808 A1* | 11/2016 | Brandt ................... H05B 45/10 |

* cited by examiner

*Primary Examiner* — Daniel D Chang
(74) *Attorney, Agent, or Firm* — Hayes Soloway PC

(57) ABSTRACT

A driver unit for programming an output current of a driver with an output stage for providing the output current and a primary control stage with a control input for controlling the output current has been provided. The driver unit includes a programmable memory unit for storing data corresponding a target value of the output current, a programming signal circuit configured to provide electric signals for writing the data in the programmable memory unit as well as a controller circuit with a controller. The controller is operatively connected to the programmable memory unit and is configured to read out the data stored in the programmable memory unit and generate a controller output signal for adjusting the output current of the driver, based on the data stored in the programmable memory unit.

15 Claims, 1 Drawing Sheet

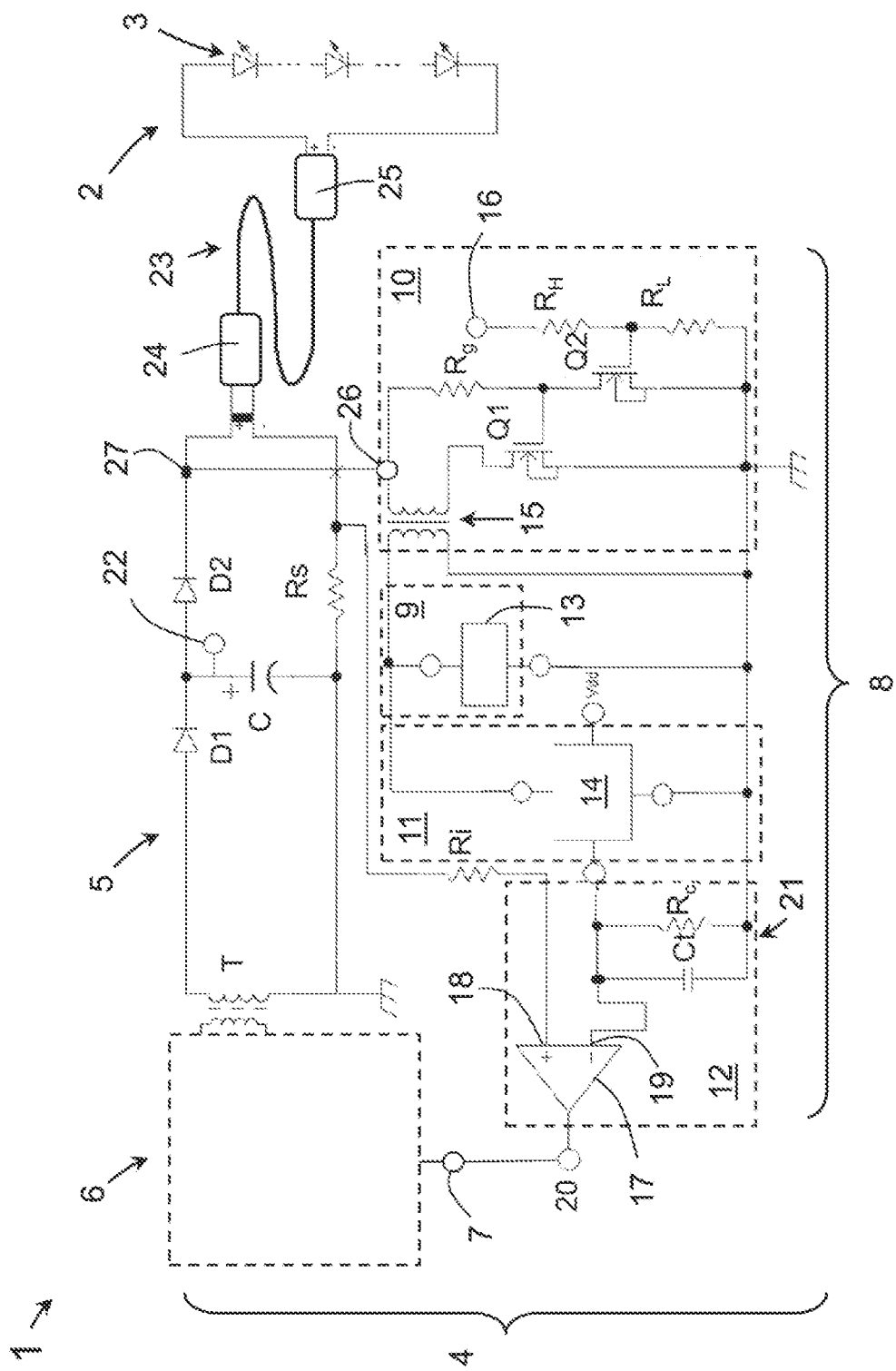

DRIVER UNIT, DRIVER AND LED LIGHT SOURCE WITH A DRIVER

CROSS-REFERENCE TO RELATED APPLICATIONS AND PRIORITY

This patent application claims priority from Chinese Patent Application No. 202010373974.X filed May 6, 2020. This patent application is herein incorporated by reference in its entirety.

TECHNICAL FIELD

The technical field of the present disclosure generally relates to drivers for driving loads. In particular, the present disclosure relates to a driving unit, a driver and an LED (light emitting diode) light source with a driver.

BACKGROUND

Drivers for providing an output current for driving loads are known. Further, drivers with adjustable output current are also known, such that the driver current can be set by means of external elements, such as resistors, jumpers or switches. Such drivers, however, provide only a limited selection for the output current value, while drivers with wider options for the output current settings are relatively complex, error-prone and expensive.

SUMMARY

An object of the present application is to provide a driver unit for programming an output current of a driver which is particularly robust and inexpensive.

According to a first aspect, a driver unit for programming an output current of a driver with an output stage for providing the output current and a primary control stage with a control input for controlling the output current is provided. The driver unit comprises a programmable, in particular, electrically programmable memory unit for storing data corresponding to or representing a target value or target level of the output current. The driver unit further comprises a programing signal circuit configured to provide electric signals for writing the data in the programmable memory unit and a controller circuit with a controller, or micro-controller unit operatively connected to the programmable memory unit. The controller is configured to read out the data stored in the programmable memory unit and generate a controller output signal for adjusting the output current of the driver, based on the data stored in the programmable memory unit. In particular, based on the controller output signal, a control signal for feeding in the primary control stage of the driver can be provided, such that a control loop for adjusting the output current of the driver in accordance with the data stored in the programmable memory unit can be formed.

By feeding in the control signal in the control input of the primary control stage of the driver, the driver output current can be easily set in accordance with the data stored in the programmable memory unit. Thus, the driving unit can be used for providing a programmable driver which allows to set and regulate the output current at a desired level.

The programming signal circuit may comprise a terminal connectable to the output stage of the driver or driver bus. Further, the programming signal circuit may be configured such that the electric signals for writing the data in the programmable memory unit are disableable by applying a voltage at the terminal, in particular, relative to a ground potential.

The terminal of the programming signal circuit may be connected with the output stage of the driver in such a way that when the driver is in operation, there is an electric potential at the terminal, disabling the electric signals for writing the data in the programmable memory unit. Thus, the process of programming of such a driver is only possible when the driver is "off-line" or switched off. This off-line programming feature makes the driver particularly convenient and safe for the user, since for programming such a driver, the driver must be switched off, and the user has no reason to contact the driver for programming, as long as the driver is in operation.

The programming signal circuit may comprise an enabling switch for enabling the electric signals for writing the data in the programmable memory unit. In particular, the programming signal circuit may comprise an output circuit, and the enabling switch may be configured such that closing the enabling switch closes the output circuit. Hence, in order to program the programmable memory unit, the enabling switch, which is otherwise open, must be closed. Thus, in the normal state, when the programmable memory unit is not being programmed, the output circuit is open, and the programming signal circuit is disabled. Consequently, the programming signal circuit consumes particularly low power. Besides, any unintentional writing or erasing of data in the memory by an erroneous signal can be avoided.

The programming signal circuit may further comprise a disabling switch for disabling the electric signals for writing the data in the programmable memory unit, in particular, by opening the enabling switch, when a voltage at the terminal is applied. Therefore, irrespective whether the driver is in operation or not, the programming signal circuit is always disabled, unless the programming signal circuit is used for programming the programmable memory unit. Thus, the power consumption of the programming signal circuit can be reduced.

In some embodiments, the enabling switch and the disabling switch may be transistor switches based on MOSFETs (metal-oxide-semiconductor field-effect transistor), each of the MOSFETs comprising a source, a drain and a gate, wherein the gate of the enabling switch is connected with the drain of the disabling switch and the gate of the disabling switch is electrically connected to the terminal of the programming signal circuit. MOSFETs are suitable switches because of their robustness and low power consumption.

The programmable memory unit may comprise a single-wire programmable memory device. For programming a single-wire programmable memory device, one electric line is required. Hence, any complex interface for programming the programmable memory unit can be avoided. In particular, any wireless interface, e.g. based on an NFC (near field communication), BLE® (Bluetooth Low Energy), or WiFi® protocol, can be avoided. Moreover, the wireless interfaces require antennas which are unsuitable for metal housing applications, cause additional costs for waterproof design and standby power loss during programming. Moreover, for programming communication between programming device and the programmable memory unit, a connection wire connecting the output stage of the driver to the load can be used. Thus, the single-wire programmable memory unit allows to keep the circuitry of the programmable driver simple and compact.

The programmable memory unit may comprise an EEPROM (electrically erasable programmable read-only memory), in particular a one-wire-programmable EEPROM, which is an easily available low-cost commodity component.

The output circuit of the programming signal circuit may comprise an inductive element configured to inductively couple the electric signals for writing the data to the programmable memory unit. The inductive coupling between the programming signal circuit and the programmable memory unit can serve as a low-pass filter or surge arrester for suppressing interference signals.

The controller circuit may be operatively connectable to the output stage of the driver, such that the data communication between the controller and the programmable memory unit is disabled when the driver is off. In particular, the controller may comprise a terminal connectable with the output stage of the driver, and the controller may be configured such that the data communication between the controller and the programmable memory unit is disableable by applying a voltage on the terminal. By disabling the data exchange between the programmable memory unit and the controller, power dissipation, in particular, caused by the data communication between the programmable memory unit and the controller, in a stand-by regime, can be avoided.

The driver unit may comprise an output section connectable to the output stage of the driver and configured to form the control signal based on the controller output signal and a current value of the output current. In particular, the output section of the driver unit can be configured such that the output signal is formed in accordance or suitable to the control input of the driver.

The output stage may comprise an error amplifier or differential amplifier with a first input connectable to the output stage of the driver for sampling the output current and a second input electrically connected to the controller output for providing a reference for the error amplifier. The output signal of the error amplifier reflects the difference between the current value of the output current and the target level of the output current. The differential signal at the output of the error amplifier can be used for keeping the output current of the driver essentially at the target level.

In some embodiments, the controller is configured such that the controller output signal is a PWM (pulse-width modulation) signal with a duty cycle depending on the data stored in the programmable memory unit. Controllers or microcontroller units providing a PWM signal with variable duty cycles are easily available low-cost commodity components.

The driver unit may comprise a controller output circuit with an RC filter for providing a DC (direct current) reference voltage for the error amplifier. In particular, the RC filter filters the controller output signal such that the reference voltage level at the second input of the error amplifier reflects the characteristics, in particular the duty cycle, of the controller output signal, and hence the data stored in the memory unit. Thus, when a voltage reflecting the current value of the output current is applied at the first input of the error amplifier, the error amplifier can provide a correction signal as an input for the control input of the driver, adjusting the output current at the target level. Hence an analog controlling for adjusting the output current, in particular, without PWM flickering, can be achieved.

According to another aspect a driver comprising a driver output stage or driver bus for providing an output current, a primary control stage with a control input for controlling the output current and a driver unit according to the first aspect for programming the output current of the driver is provided. The output stage of the driver unit is connected to the control input of the driver such that the output current is adjustable essentially at the target level, based on the data stored in the programmable memory unit of the driver unit. The driver is particularly reliable, inexpensive, and easy to program.

The programming signal circuit of the driver unit may be connected to the output stage of the driver, such that the programming signal circuit is disabled when the driver is on. By disabling the programming signal circuit, the programming of the driver is not possible when the driver is on. Thus, such a driver is also safe for the user.

According to a third aspect an LED light source is provided. The LED light source comprises at least one LED for generating light and a driver according to the above aspect, connected to the at least one LED such that the at least one LED can be driven by the driver. Due to the programmable output current of the driver, the current flowing through the at least one LED and hence the light output of the light source can be easily programmed by the user. Besides, such a programmable light source is particularly inexpensive and safe for the user.

BRIEF DESCRIPTION OF THE DRAWINGS

In the following description, details are provided to describe the embodiments of the present specification. It shall be apparent to one skilled in the art, however, that the embodiments may be practiced without such details.

Some parts of the embodiments have similar parts. The similar parts may have same names or similar part numbers. The description of one part applies by reference to another similar part, where appropriate, thereby reducing repetition of text without limiting the disclosure.

FIG. 1 shows a schematic circuit diagram of an LED light source with a driver and a driver unit according to an embodiment.

DETAILED DESCRIPTION OF THE DRAWINGS

FIG. 1 shows a schematic circuit diagram of an LED light source with a driver and a driver unit according to an embodiment. The LED light source 1 comprises an LED module 2 with a number of LEDs 3. The LED light source 1 further comprises a driver 4 with a driver output stage 5 for providing an output current, a primary control stage 6 (shown schematically) with a control input 7 for controlling the output current of the driver 4 and a driver unit 8 for programming the output current of the driver 4.

In the embodiment of FIG. 1, the driver unit 8 comprises a programmable memory unit 9, a programming signal circuit 10, a controller circuit 11 and an output section 12. The programmable memory unit 9 comprises a programmable memory device 13 for storing data corresponding or representing a target value of the output current. The programming signal circuit 10 is configured to provide electric signals for writing the data in the programmable memory device 13 of the programmable memory unit 9. The controller circuit 11 comprises a controller 14 operatively coupled to the programmable memory device 13 and is configured to read out the data stored in the programmable memory device 13 and generate a controller output signal for adjusting the output current of the driver 4, based on the data stored in the programmable memory device 13.

The programming signal circuit 10 comprises a transformer 15 for inductively coupling the programming signal circuit 10 with the programmable memory unit 9. The programming signal circuit 10 further comprises an enabling switch Q1 for enabling the electric signals for writing the data in the programmable memory device 13 and a disabling switch Q2 for disabling the electric signals for writing the data in the programmable memory device 13. The programming signal circuit 10 also comprises a terminal 16 electrically connected to a control input of the disabling switch Q2. In the present embodiment, the switches Q1 and Q2 are MOSFETs (metal-oxide-semiconductor field-effect transistors), each comprising a source, a drain and a gate, wherein the gate of the enabling switch Q1 is connected with the drain of the disabling switch Q2 and the gate of the disabling switch Q2 is electrically connected to the terminal 16 of the programming signal circuit 10. In the embodiment of FIG. 1, the MOSFETs are enhancement-type n-channel MOSFETs. FIG. 1 also shows a gate resistor $R_g$ of Q1, a high side resistor $R_H$ and a low side resistor $R_L$ of Q2.

The programmable memory device 13, according to the embodiment of FIG. 1, is a one-wire-programmable EEPROM (electrically erasable programmable read-only memory) with a single programming input electrically connected to the secondary coil of the transformer 15. The one-wire-programmable EEPROM is an easily available low-cost commodity component.

The controller 14 is configured for providing a PWM (pulse-width modulation) signal with a duty cycle depending on the data stored in the programmable memory unit 9.

The output section 12 of the driver unit 8 comprises an error amplifier 17 or differential amplifier with a first input 18 for sensing an output voltage of the output stage 5 of the driver 4 and a second input 19 for inputting a reference voltage and an output 20. The output section 12 further comprises an RC filter 21, with a resistor $R_c$ and a capacitor $C_f$, for providing a DC (direct current) reference voltage for the error amplifier 17.

The output stage 5 of the driver 4 comprises a transformer T coupled with the output of the primary control stage 6 and a rectifier circuit with a first diode D1, a second diode D2 and an electrolytic capacitor C. The output stage 5 further comprises a sensing Resistor $R_s$ for sensing or sampling the output current of the driver 4 by measuring a voltage drop on the sensing resistor $R_s$. The output stage 5 also comprises a terminal 22 for sensing an output voltage of the driver output stage 5.

In the LED light source 1 of FIG. 1, the output stage 5 of the driver 4 is connected to the LED module 2 with a driver bus 23 with connectors 24 and 25 for driving the LEDs 3. The driver unit 8 is operatively coupled with the output stage 5 and the primary control stage 6 of the driver 4, such that the output current of the driver 4 can be programmed by means of the driver unit 8. In particular, the output 20 of the error amplifier 17 is electrically connected to the control input 7 of the primary control stage 6 of the driver 4 and the terminal 16 of the programming signal circuit 10 is electrically connected with the terminal 22 of the output stage 5 of the driver 4. For the sake of simplicity, the connection between the terminal 16 and terminal 22 is not shown. Further, a programming input 26 of the programming signal circuit 10 is electrically connected to an output terminal 27 of the output stage 5 and the first input 18 of the error amplifier 17 is electrically coupled to the sensing resistor $R_s$ over an input resistor $R_i$. The input 18 of the error amplifier 17 is electrically connected to the output stage 5 of the driver 4 such that the potential at the first input 18 of the error amplifier corresponds to the voltage drop on the sense resistor $R_s$ of the output stage 5 of the driver 4. Since the output terminal 27 is connected to the programming input 26 of the programming signal circuit 10, the driver bus 23 can be used for programming the programmable memory unit 9, in particular, for writing the data representing the target value of the output current in the programmable memory device 13.

In some embodiments, the controller circuit 11 is operatively connectable to the output stage 5 of the driver 4 such that the data communication between the controller and the programmable memory unit is disabled when the driver is off. In particular, the controller circuit 11 may comprise a terminal connectable with the output stage 5 of the driver, and the controller 14 may be configured such that the data communication between the controller 14 and the programmable memory unit 9 is disableable by applying a voltage on the terminal. In some embodiments, the controller 14 comprises a voltage supply pin $V_{dd}$ connectable to the output stage 5 of the driver 4, such that, when the driver is switched off, the power supply of the controller 14 is also cut off. By disabling the data exchange between the programmable memory unit 9 and the controller 14, the energy required for the data communication between the programmable memory unit and the controller can be saved.

In the operation of the LED light source 1, the terminal 16 is at a positive voltage (relative to the ground potential) and the switch Q2 is closed. The source electrode of Q2 is connected to the gate electrode of Q1 such that the closing of Q2 opens the switch Q1 and hence disrupts the output circuit of the programming signal circuit 10. Thus, the programming of the driver unit 4 is disabled, when the driver 4 is in operation.

Further, since the Q1 is an enhancement-type n-channel transistors, the Q1 is normally "off" or open. Therefore, even if the driver 4 is not in operation, the programming signal circuit 10 is disabled. Hence, for programming the programmable memory unit 9 of the driver unit 8, both conditions must be fulfilled, namely, the driver 5 should be off and the programming signal circuit 10 should be enabled, in particular, by applying a programming voltage at the programming input 26.

Such a programmable driver is not only easy to program, but also reliable and safe for the user, since the programming signal circuit 10 has to be enabled for writing data in or erasing data from the programmable memory unit 9 and the user is prompted to switch the driver 4 off, before he starts to program the driver 4.

Once the output current is set at a target level by accordingly programming the programmable memory unit 9, in particular, by means of an external programming device connected to the driver bus 23, the output current of the driver 4 can be adjusted at the target level. In particular, during the operation of the driver 4, the controller 14 reads out the data stored in the programmable memory device 13, representing the target value of the output current, and generates a PWM signal with a duty cycle reflecting or corresponding to the target value of the output current. The RC filter 21 filters the controller output signal such that the reference voltage level at the second input 19 of the error amplifier 17 reflects the duty cycle, of the controller output signal. Since the potential at the first input 18 of the error amplifier 17 represents the voltage drop on the sensing resistor $R_s$ and hence reflects the current value of the output current, the error amplifier 17 can provide a correction signal as an input for the control input 7 of the primary control stage 6 of the driver 4 for adjusting the output current at the target level. Hence, the output current can be controlled or regulated in an analog way, without deteriorating the light generated by the LED light source by any PWM flickering.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

The invention claimed is:

1. A driver unit for programming an output current of a driver with an output stage for providing the output current and a primary control stage with a control input for controlling the output current, the driver unit comprising:
    a programmable memory unit for storing data corresponding to a target value of the output current,
    a programming signal circuit configured to provide electric signals for writing the data in the programmable memory unit; and
    a controller circuit with a controller operatively connected to the programmable memory unit, the controller being configured to read out the data stored in the programmable memory unit and generate a controller output signal for adjusting the output current of the driver, based on the data stored in the programmable memory unit.

2. The driver unit according to claim 1, wherein the programming signal circuit comprises a terminal connectable to the output stage of the driver, and wherein the programming signal circuit is configured such that the electric signals for writing the data in the programmable memory unit are disabled by applying a voltage at the terminal.

3. The driver unit according to claim 1, wherein the programming signal circuit comprises an enabling switch for enabling the electric signals for writing the data in the programmable memory unit.

4. The driver unit according to claim 3, wherein the programming signal circuit comprises a disabling switch for disabling the electric signals for writing the data in the programmable unit by opening the enabling switch, when a voltage is applied on the terminal.

5. The driver unit according to claim 4, wherein the enabling switch and the disabling switch are MOSFETs, each of the MOSFETs comprising a source, a drain and a gate, and wherein the gate of the enabling switch is connected with the drain of the disabling switch and the gate of the disabling switch is electrically connected to the terminal of the programming signal circuit.

6. The driver unit according to claim 1, wherein the programmable memory unit comprises a single-wire programmable memory device.

7. The driver unit according to claim 1, wherein the programming signal circuit comprises an inductive element configured to inductively couple the electric signals for writing the data to the programmable memory unit.

8. The driver unit according to claim 1, wherein the controller circuit is operatively connectable to the output stage of the driver such that the data communication between the controller and the programmable memory unit is disabled when the driver is off.

9. The driver unit according to claim 1, wherein the driver unit further comprises an output section connectable to the output stage of the driver and configured to form a control signal based on the controller output signal and a current value of the output current provided by the output stage.

10. The driver unit of claim 9, wherein the controller is configured such that the controller output signal is a PWM signal with a duty cycle depending on the data stored in the programmable memory unit.

11. The driver unit of claim 10, wherein the output section comprises an error amplifier with a first input connectable to the output stage of the driver for sampling the output current and a second input electrically connected with a controller output for providing a reference for the error amplifier.

12. The driver unit of claim 11, wherein the driver unit further comprises a controller output circuit with an RC filter for providing a DC reference voltage for the error amplifier.

13. A driver, comprising a driver output stage for providing an output current, a primary control stage with a control input for controlling the output current and a driver unit according to claim 1 for programming the output current of the driver, wherein the output stage of the driver unit is connected to the control input of the driver such that the output current is adjustable at the target value, based on the data stored in the programmable memory unit of the driver unit.

14. The driver according to claim 13, wherein the programming signal circuit of the driver unit is connected to the driver output stage such that the programming signal circuit is disabled when the driver is on.

15. An LED light source comprising:
    a driver according to claim 13; and
    at least one LED configured for generating light and connected to the driver such that the at least one LED is able to be driven by the driver.

* * * * *